(No Model.)  2 Sheets—Sheet 1.
A. C. BOTH.
SCALE DIVIDER AND SECTION LINER.
No. 393,290. Patented Nov. 20, 1888.
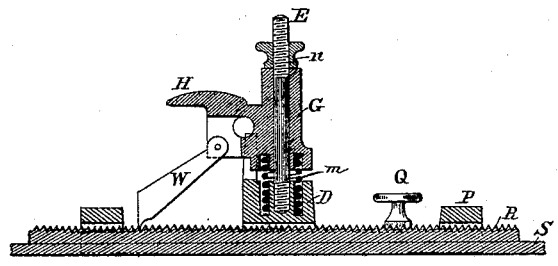
FIG. II
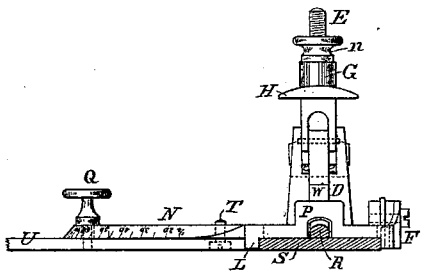
FIG. III
FIG. I
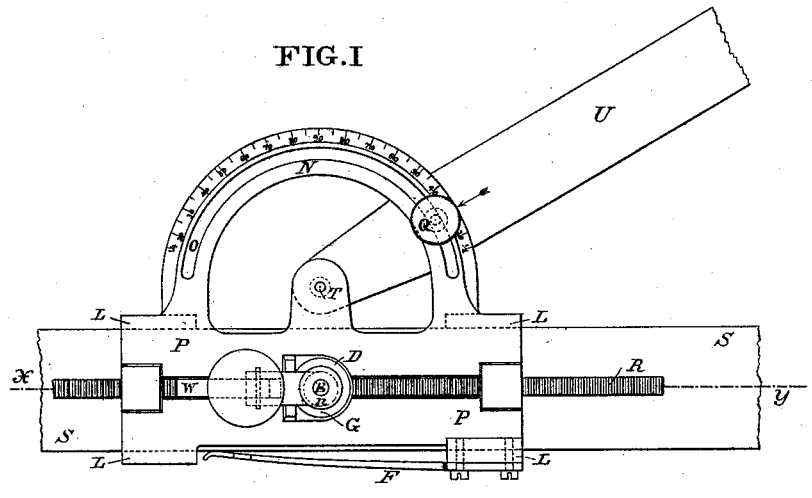
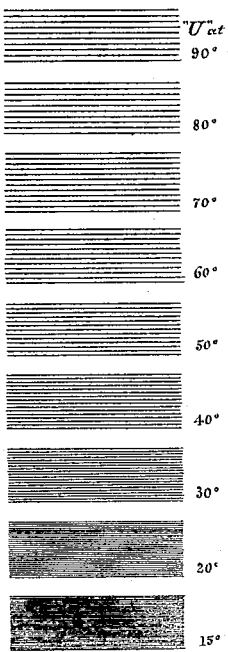
Fig. IV
Scales to the foot:
 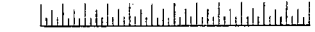 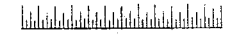
3"  2"  1½"
   
1"  ¾"  ½"  ¼"
FIG. V
WITNESSES:  INVENTOR:
D. O'B. Donoghue  Adolph C. Both
C. P. Wilder.

(No Model.) 2 Sheets—Sheet 2.
A. C. BOTH.
SCALE DIVIDER AND SECTION LINER.
No. 393,290. Patented Nov. 20, 1888.
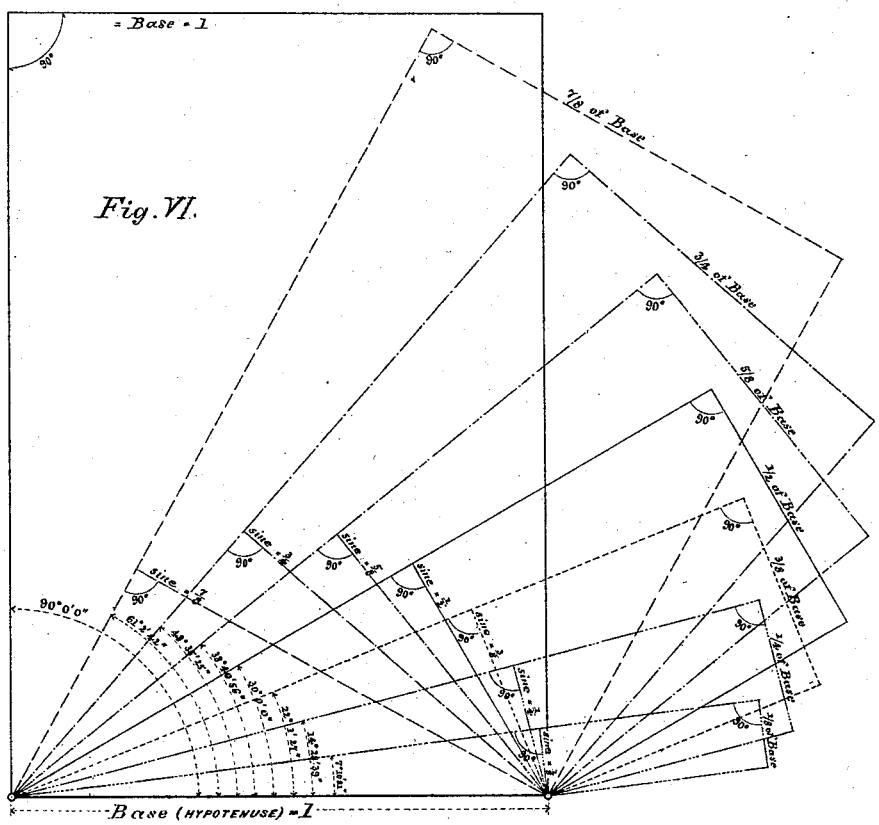
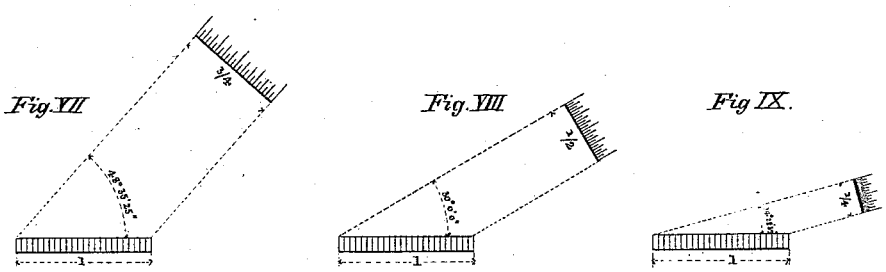
Witnesses: Inventor:
C. P. Wilder. Adolf C. Both.

UNITED STATES PATENT OFFICE.

ADOLPH C. BOTH, OF PORTLAND, MAINE.

SCALE-DIVIDER AND SECTION-LINER.

SPECIFICATION forming part of Letters Patent No. 393,290, dated November 20, 1888.

Application filed March 31, 1888. Serial No. 269,181. (No model.)

*To all whom it may concern:*

Be it known that I, ADOLPH C. BOTH, a citizen of the United States, residing at Portland, in the county of Cumberland, State of Maine, have invented certain new and useful Improvements in Parallel Rulers; and I do hereby declare the following to be a full, clear, and exact description of the invention, such as will enable others skilled in the art to which it appertains to make and use the same.

My invention relates to an instrument which is adapted to produce at once measuring-scales upon drawings with positive accuracy simply by setting the instrument for the particular scale wanted, as will be more fully explained hereinafter.

In the accompanying drawings, Figure I is a top view of the instrument. Fig. II is a vertical section on line $xy$. Fig. III is a side view. Figs. IV and V represent the samples of work when the instrument is used as a section-liner, the result of the different positions of the ruler being shown for every ten degrees variation. Fig. VI represents a diagram of the theory upon which the action of the instrument is based. Figs. VII, VIII, and IX are illustrations of how scales are produced with this instrument.

In the drawings, S represents a straight-edge with a rack, R, secured to the upper face of the same in its center longitudinally. The ruler-plate P is fitted by means of guiding-lugs L L, projecting over the edges of the straight-edge to slide upon the latter. To increase the regularity and evenness of the sliding motion and to equalize any possible slack, a spring, F, is attached to one corner of this plate P, and the other end of said spring presses against the edge of the straight-edge S. Through the center of this plate P for its whole length is a slot bridged over the ends for the rack to run in. On the plate is a plate-mover for giving it an equal step-by-step movement. The particular construction of this plate-mover, as shown, is as follows: In the middle of the plate P over the slit is the standard D, into the center of which is secured the spindle E, upon which slides up and down the sleeve G. This sleeve G has a projection on one side as thick as the small cylindrical part of the sleeve. The top of this projection is formed into a button, H, to receive the pressure of the finger of the manipulator, whereby the sleeve G is pressed downward. A spiral spring, $m$, partially inclosed in an annular recess cut into the standard D concentric with the spindle, and partly into a similar recess cut into the bottom of the sleeve G, will push the sleeve upward if the pressure of the finger upon the button H ceases. At the lower corner of the projection of the sleeve G is pivoted a pawl, W, the other end of which engages by its own weight with the teeth of the rack R. By means of the nut $n$ the vertical motion of the sleeve G can be adjusted to such fixed positions as are required to engage the pawl W with one, two, or more teeth of the rack R, and a downward pressure of the sleeve will thus cause the ruler-plate P to be pushed a distance upon the straight-edge S corresponding to the distance between one, two, or more teeth. The progressive motion for each push is positively accurate and equal to the division, or some multiple thereof, of the rack.

By an inspection of Fig. VI it will be seen that a certain motion along the base (hypotenuse) can be reduced in any desired ratio to this base, provided this is done under a certain angle with the base. The ratio of the reduction of the base expressed in decimal fractions is always the natural sine of that angle under which the reduction must be made. The following table gives the angles for a number of reductions commonly used:

Base 1.

| Ratio of reduction. | In decimal fraction. | Logarithm. | Corresponding angle. | | |
|---|---|---|---|---|---|
| | | | ° | ′ | ″ |
| $\frac{1}{8}$ | 0.125 | 0.0969100 | 7 | 10 | 51 |
| $\frac{1}{4}$ | 0.25 | 0.3979400 | 14 | 28 | 39 |
| $\frac{3}{8}$ | 0.375 | 0.5740313 | 22 | 1 | 27 |
| $\frac{1}{2}$ | 0.5 | 0.6939700 | 30 | 40 | 56 |
| $\frac{5}{8}$ | 0.625 | 0.7958800 | 38 | 40 | 56 |
| $\frac{3}{4}$ | 0.75 | 0.8750613 | 48 | 35 | 25 |
| $\frac{7}{8}$ | 0.875 | 0.9420081 | 61 | 2 | 42 |
| $1$ | 1.00 | 1.00 | 90 | 0 | 0 |

If, for instance, it is required to project the twenty-four divisions of the base, (one inch in length,) so that they shall all appear in a length of one-half of the base or in one-half of an inch, the proportion of the length sought to the base is ½=0.5. This decimal fraction being the natural sine of the angle required for the purpose, we find the angle corresponding to sine 0.5 to be 30° 0′ 0″. The same method holds good for any desired fraction of the base which it is intended to divide in as many equal spaces as are contained in the base. In order now to project the division of the base (preferably one inch divided into twenty-four spaces) under such angles, I provide the ruler-plate P with a central lug and a semicircular arc, N, having a circular slit, O, through which passes the thumb-screw Q into the ruler U for holding the ruler at any desired angle. The inner end of the ruler U is pivoted in the center of the circular arc by the screw T. The central lug and the arc are raised above the lower surface of the guiding-lugs and the lower surface of the straight-edge, when the plate is in place, a distance equal to the thickness of the ruler, so that the under faces of both ruler and edge lie flush upon the paper. The beveled edge of the arc N is graduated, so that the ruler U can be set to such angles with the straight-edge S as will give the desired proportion of the scale wanted to the base, as indicated in the above table, and these or any other scale can directly and with positive accuracy be drawn at once. The division of the rack for inch-scales is preferably made with twenty-four teeth to one inch; but the rack can be cut to a decimal or any other desired divisions.

It is evident from the above descriptions that this instrument can be used as a section-liner with great advantage. The samples of such work are shown in the drawings for the different positions of the ruler-arm U for every ten degrees variation. If the instrument is adjusted to produce a one-fourth inch scale or reduction, the pawl being adjusted to engage one tooth of the rack at each time, it will give inch and half-inch lines, and it is evident that without any change a half-inch scale can be produced wherein, if every tooth of the rack is used, we will have lines for every quarter-inch, and used for an inch-scale we will have lines for every eighth of an inch. For the same manner, the instrument being set to an angle of forty-eight degrees thirty-five minutes twenty-five seconds for a quarter-inch scale, and we get half-inch divisions for a half-inch scale, without changing the instrument in the least, we will get one-quarter inch divisions, and for a three-inch scale we will get one-eighth-inch divisions, providing every tooth of the rack is used. These explanations will suffice to enable the draftsman to use the instruments for producing the commonly-used scales—one-eighth, one-fourth, three-eighths, one-half, five-eighths, three-fourths, seven-eighths, one inch, one and one-half inch, and three inch scales.

Another advantage of the positive movement of the instrument is apparent when lines of alternating thickness, as used in representing screw-threads &c., are wanted. The fine lines are drawn first for every other tooth. Then, by lifting the pawl and sliding the ruler-plate back, the heavy lines are directly and accurately drawn between the fine lines. By preparing a sample sheet of such rulings, as may be mostly wanted in an office, and marking thereon the number of teeth used and angle for ruler-arm, the draftsman is enabled to select and at once set the instrument so that the ruling produced will be identically the same as the sample. This is especially advantageous when it is desired to produce the same effect by shading. The absolute accuracy of the instrument insures faultless work, whereby the draftsman operating the same will be relieved of all anxiety regarding the performance of the instrument and simply has to watch the limits of his lines and the working of his pen.

I am aware that a ruler has been pivoted on a head provided with a toothed wheel fitted to racks in the edge of a frame, it being shown in the patent of Remick, Serial No. 345,806, July 20, 1886.

I claim as my invention—

1. In combination, a straight-edge provided with a rack on its upper face, a sliding ruler-plate having guiding-lugs fitted to the straight-edge, a plate-mover on the ruler-plate engaging with the rack on the upper surface of the straight-edge, and a ruler pivoted to the ruler-plate, all substantially as described.

2. In combination, a straight-edge provided with a rack on its face, a sliding ruler-plate having lugs fitting over the edges of the straight-edge, a plate-mover engaging with the rack, and a ruler pivoted to the plate, all substantially as described.

3. In combination, a straight-edge having a rack on its face, a ruler-plate having lugs fitted to the straight-edge and a slot for the rack, a push-pawl for moving the plate, and a ruler pivoted to the ruler-plate, all substantially as described.

4. In combination, a straight-edge having a rack on its face, a sliding ruler-plate having lugs fitted to the straight-edge, a slotted semicircular arc, and a ruler pivoted centrally in relation thereto, and having its under surface flush with the under surface of the straight-edge when the parts are in place, all substantially as described.

5. In combination, the straight-edge having a rack on its face, a ruler-plate fitted to slide thereon, having a standard and spindle, a sleeve sliding on the spindle, a pawl pivoted to the sleeve, a spiral spring under the sleeve, and an adjusting-nut on the upper end of the spindle, all substantially as described.

ADOLPH C. BOTH.

Witnesses:
D. O'C. O'DONOGHUE,
C. P. WILDER.